No. 683,239. Patented Sept. 24, 1901.
W. WILSON.
ABSORPTION REFRIGERATING MACHINE.
(Application filed Aug. 23, 1900.)
(No Model.) 2 Sheets—Sheet 1.
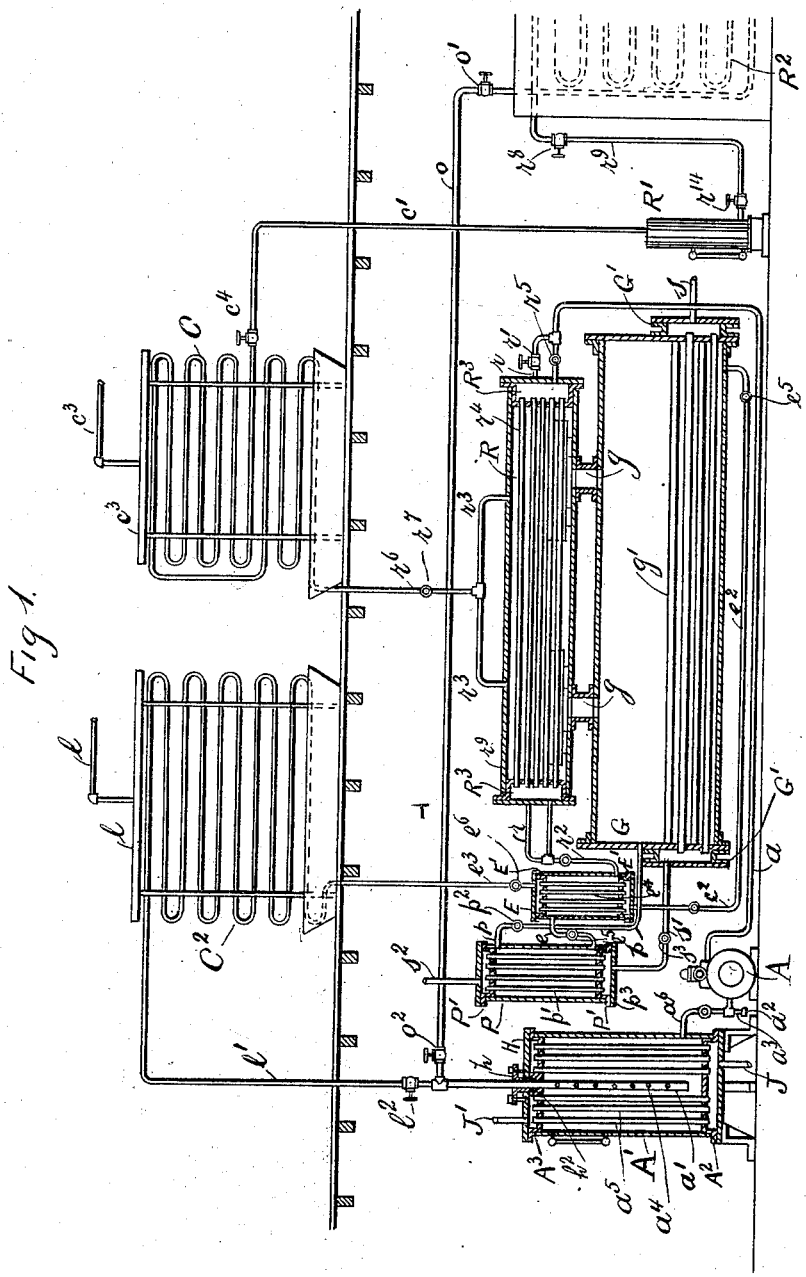
WITNESSES:
INVENTOR
William Wilson
BY A. A. de Bonneville
ATTORNEY No. 683,239. Patented Sept. 24, 1901.
W. WILSON.
ABSORPTION REFRIGERATING MACHINE.
(Application filed Aug. 23, 1900.)
(No Model.) 2 Sheets—Sheet 2.
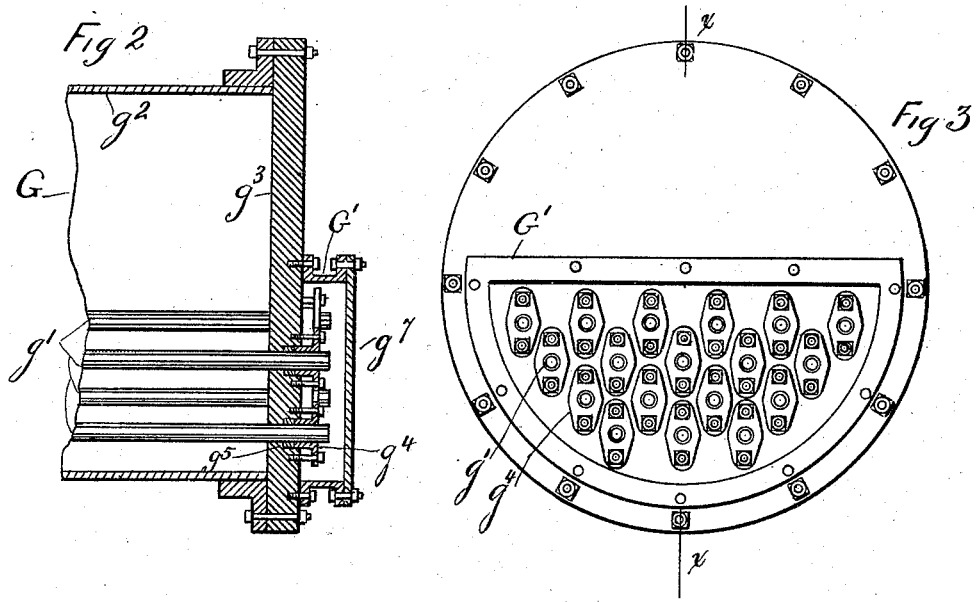
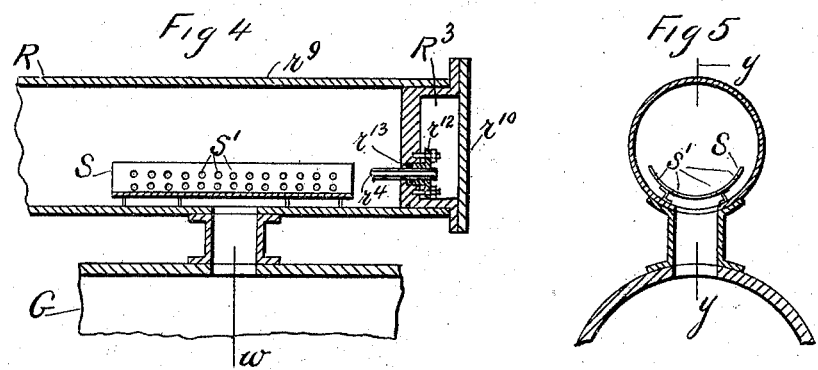
WITNESSES:
Wm P Francl
August Johnston
INVENTOR
William Wilson
BY A. A. de Bonneville
ATTORNEY

UNITED STATES PATENT OFFICE.

WILLIAM WILSON, OF BROOKLYN, NEW YORK, ASSIGNOR OF ONE-FIFTH TO CHARLES B. HARRIS, OF NEW YORK, N. Y.

ABSORPTION REFRIGERATING-MACHINE.

SPECIFICATION forming part of Letters Patent No. 683,239, dated September 24, 1901.

Application filed August 23, 1900. Serial No. 27,802. (No model.)

*To all whom it may concern:*

Be it known that I, WILLIAM WILSON, a citizen of the United States, and a resident of the borough of Brooklyn, New York city, in the county of Kings and State of New York, have invented certain new and useful Improvements in Absorption Refrigerating-Machines, of which the following is a specification.

My invention relates to improvements in absorption refrigerating-machines, and has for its object the production of apparatus for economically generating anhydrous ammonia-gas by means of steam of low pressure or exhaust-steam, and this object is attained by first mixing the discharge from expansion-coils which has performed its work with the weak liquor from which the anhydrous ammonia-gas has been generated in a vessel termed an "absorber." From thence the charge enters a rectifier to raise its temperature and cool the ammonia-gas which is being generated in a vessel which I call the "main" generator, thereby throwing down any moisture contained in the said gas. I then send the charge through an exchanger, where it is again heated by means of the weak liquor passing through the same and which comes from the generator on its way to the absorber. I next allow the charge to enter a preliminary generator, where steam, after having performed its work in the main generator, still further heats the charge, and from which it enters the main generator to be completely vaporized. My improvements consist in the method of employing the various parts and in the details of construction.

With these objects in view my apparatus consists in the combination of parts shown in the drawings, described in the specification, and pointed out in the claims.

Referring to the drawings, Figure 1 shows an elevation of my apparatus, partly in section. Fig. 2 represents a fragmentary section of the generator, taken on the line $x\ x$ of Fig. 3. Fig. 3 is an end view of the generator with the bonnet removed. Fig. 4 represents a fragmentary section of the rectifier and generator on line $y\ y$ of Fig. 5. Fig. 5 is a section of Fig. 4, taken on line $w$ of said figure.

Referring to Fig. 1, a pump is shown at A for circulating the liquid used in the system. The generator is shown at G with its special heads G'. On the generator G is mounted the rectifier R with its special heads $R^3$ by means of the connections $g$. The exchanger is represented at E with its special heads E', the preliminary generator at P with its special heads P', the absorber at A' with its special heads $A^2$, the receiver at R', the condenser at C, cooling-coils at $C^2$, and the expansion-coils at $R^2$. The generator is of special construction and, referring to Figs. 2 and 3, it will be seen to consist of an outer shell $g^2$ with heads $g^3$, said heads being perforated for the tubes $g'$, which are secured in place by the stuffing-boxes shown, which contain the glands $g^4$, pressing on the rubber packing $g^5$ to secure tight joints, the ends of the tubes projecting through the stuffing-boxes, and all are incased by the chest G' with its bonnet $g^7$. Fig. 3 shows an end view of the generator with the bonnet $g^7$ removed. By means of this device the tubes can be easily cleaned, adjusted, and replaced. Fig. 4 shows a fragmentary longitudinal section through the generator G, rectifier R, and separating-plates S on the line $y\ y$ of Fig. 5. The rectifier shows its outer shell $r^9$ with its barrel-shaped heads $R^3$ let into the same and is provided with stuffing-boxes consisting of the glands $r^{12}$, pressing on rubber packing $r^{13}$, (only one tube being shown in Fig. 4 to avoid confusion.) The heads $R^3$ are covered with bonnets $r^{10}$. The heads of the exchanger E, preliminary generator P, and absorber A' are similarly constructed, with the exception that in the absorber a stuffing-box with gland $h$ runs through the bonnet H and into a cavity in upper head $A^3$, holding therein a rubber packing-ring $h^2$ for securing the pipe $a'$ tightly in place, the said pipe being perforated with holes $a^4$. The piping, valves, and connections are described further on with the method of operating my apparatus.

To operate my invention, aqua-ammonia is taken through the suction-pipe $a^3$ of the pump A (the end of the pipe $a^3$ being closed with a cap $a^2$ when the system is not being charged) and is forced into the rectifier R through the pipe $a$, the end of the said pipe leading into one of the heads $R^3$ of the rectifier R, entering the tubes $r^1$, contained therein. A by-pass pipe $r$ is fitted to the pipe $a$, said by-pass connecting with the pipe $a$ near the ends of the rectifier. A valve $r'$ is fitted in said by-pass, and a valve $r^5$ is fitted to the pipe $a$. Both the by-pass and pipe $a$ lead to the pipe $r^2$. By a proper manipulation of the valves $r'$ and $r^5$ the amount of aqua-ammonia forced through the tubes of the rectifier can be easily regulated, thus maintaining the rectifier at a proper temperature. The aqua-ammonia then enters the lower part of the exchanger E by means of the pipe $r^2$ rising on the outside of the tubes $e^4$ and leaving the exchanger through the pipe $e$, fitted with the valve $e^5$. The charge then enters the lower end of the preliminary generator P, where it is heated and rises in the same on the outside of the tubes $p'$ and leaves through the pipe $p$, fitted with the valve $p^2$, and enters the main generator G, where it receives more heat and is thereby vaporized and allowed to escape through the connections $g$ $g$ into the rectifier R on the outside of the tubes $r^4$. The gases after passing the connections $g$ $g$ strike baffle-plates S S, which are perforated with the small holes S', allowing the vapor to pass, but throwing back any moisture contained therein. The anhydrous gas leaves the rectifier through the piping $r^3$ $r^3$ $r^6$, fitted with a valve $r^7$, and enters the four lower sections of the condenser C, then passes to the uppermost section, from which it takes a downward direction. Water is sprayed on the outside surfaces of the condensers C by means of the piping $c^3$ $c^3$, which condenses the gas, after which it is led through the pipe $c'$, fitted with the valve $c^4$, and enters the receiver R', from which it is conducted to the expansion-coils $R^2$ through the piping $r^9$, in which is fitted the valve $r^{14}$ and expansion-cock $r^8$. The liquor after expanding in the coils $R^2$ leaves the same through the pipe $o$, fitted with the valves $o'$ and $o^2$, and enters the perforated pipe $a'$, located in the absorber A', and is absorbed by the weak aqua-ammonia contained therein. The weak aqua-ammonia is derived from the lower portion of the generator G, being the residue after the charge therein has been heated, the said liquor leaving the same through the piping $e^2$, fitted with the valve $e^6$, and enters the exchanger through its lower head on the inside of the tubes, where it imparts its heat to the charge contained on the outside and which has entered the same from the rectifier. The weak liquor leaves the exchanger through the piping $e^3$, fitted with the valve $e^6$, when it enters the lower section of the cooling-coils $C^2$, rising in the same. Water is sprayed on the cooling-coils by means of the pipes $l$ $l$. The weak liquor reaches the absorber through the piping $l'$ and finally mixes with the returns from the expansion-coils $R^2$ in the perforated pipe $a'$, where the mixture is cooled and condensed by means of water circulating on the inside of the tubes $a^5$, the water entering through the piping J and leaving through J'. The charge is drawn through the pipe $a^6$ to the pump A. The suction-pipe $a^3$ is only used when a new charge of aqua-ammonia is required to make up for leakage. The complete cycle of the refrigerant has been described before taking up the source of heat which vaporizes the same to avoid confusion, and I will now describe the method of applying the latter. Exhaust or any low-pressure steam is admitted into the generator G through the pipe $s$, which passes through the same on the inside of the tubes $g'$ and in so doing heats the aqua-ammonia contained in the generator on the outside of the tubes and vaporizes it, as already described. The said steam leaves the generator through the pipe $s'$, fitted with the valve $s^3$, and enters the bonnet $p^3$ on lower head P' of the preliminary generator P through the inside of its tubes $p'$, where it imparts the heat to the aqua-ammonia contained on the outside of said tubes and which has been forced there from the exchanger after first having been led through the rectifier direct from the pump A and is thus partly heated before entering the generator G. The steam leaves the system by escaping from the preliminary generator by means of the pipe $s^2$.

Having described my invention, I desire to secure by United States Letters Patent and claim—

1. In an absorption refrigerating-machine, a generator with adjustable tubes; a rectifier with adjustable tubes; connections between said generator and rectifier; separating-plates in the rectifier; a condenser connected to rectifier; an absorber; expansion-coils connected with absorber; cooling-coils connected with absorber; piping from expansion-coils and cooling-coils terminating in a perforated pipe in the absorber; an exchanger with adjustable tubes; a circulating-pump, with its suction-pipe leading from the absorber, and its discharge-pipe entering the rectifier, and from thence to the exchanger; a by-pass in said discharge-pipe, connecting the same directly to the said exchanger; steam inlet and outlet pipes attached to the generator.

2. In an absorption refrigerating-machine; a generator with adjustable tubes; a rectifier with adjustable tubes; connections between the rectifier and generator; an absorber with adjustable tubes; a circulating-pump, with its suction-pipe leading from the absorber, and its discharge-pipe entering the rectifier; an exchanger connected to rectifier with piping; a by-pass in the aforesaid pump-discharge pipe connecting the pump directly with the exchanger, condenser-coils connecting with the outlet of rectifier; cooling-coils connected with the exchanger; an absorber connected with outlet of said cooling-coils; expansion-coils connected with the outlet of the cooling-coils; a perforated pipe in the absorber connected with outlet of both cooling-coils and expansion-coils; adjustable tubes with stuffing-boxes and packing in the absorber; water inlet and outlet pipes for the absorber; a liquid-refrigerant receiver connected with condenser and expansion-coils; an expansion-cock in piping between receiver and expansion coils; a preliminary generator connected with the exchanger and main generator; steam-piping entering the main generator, and leading from the main generator to preliminary generator, and from thence leaving the system.

3. An absorption refrigerating-machine, comprising a pump A, a rectifier R, discharge-piping of said pump leading to the rectifier, a by-pass $r$ in said piping, a generator G connected to the rectifier with connections $g$, an exchanger E, piping $e^2$ leading from the generator to the exchanger, outlet-piping $e^3$ running from the exchanger, cooling-coils $C^2$ connecting with piping $e^3$, spray-piping $l, l$ over cooling-coils $C^2$, outlet-piping $r^3, r^6$ leading from the rectifier, condenser C with spray-piping $c^3$ connected with the pipe $r^6$ of rectifier, piping $r^2$ leading from the rectifier to the exchanger, a preliminary generator P, piping $e$ running from the exchanger to the preliminary generator, outlet-piping $p$ leading from the preliminary generator to the main generator, a steam-pipe $s$ connected to generator G, outlet-steam piping $s'$ connecting the generator and preliminary generator P, and exhaust-steam pipe $s^2$ leading from preliminary generator, an absorber A', piping $l'$ connecting cooling-coils $C^3$ and the absorber A', a receiver R', piping $c'$ connecting receiver and condenser, expansion-coils $R^2$, piping $r^9$ connecting the receiver and expansion-coils, outlet-piping $o$ leading from the expansion-coils $R^2$ to the absorber.

Signed at 11 Broadway, New York city, in the county of New York and State of New York, this 20th day of August, A. D. 1900.

WILLIAM WILSON.

Witnesses:
 WM. P. FRANCL,
 AUGUST JOHNSTON.